United States Patent [19]
Luckenbach et al.

[11] Patent Number: 5,656,243
[45] Date of Patent: Aug. 12, 1997

[54] FLUIDIZED BED REACTOR AND PROCESS FOR PERFORMING REACTIONS THEREIN

[75] Inventors: Edward C. Luckenbach, Mountainside, N.J.; Frederick A. Zenz, Garrison, N.Y.; Giovanni Papa; Andrea Bartolini, both of Milan, Italy

[73] Assignee: Snamprogetti S.p.A., Milan, Italy

[21] Appl. No.: 416,364

[22] Filed: Apr. 4, 1995

[51] Int. Cl.$^6$ .................................................. F27B 15/02
[52] U.S. Cl. ..................... 585/684; 422/139; 422/143; 422/147; 422/211; 422/220; 422/141
[58] Field of Search ..................... 422/139, 141, 422/143, 147, 211, 220; 585/684

[56] References Cited

U.S. PATENT DOCUMENTS

| | | | |
|---|---|---|---|
| 2,944,009 | 7/1960 | Huntley et al. | 208/155 |
| 3,482,946 | 12/1969 | Shirk | 422/141 |
| 3,783,528 | 1/1974 | Sheely | 422/141 |
| 4,691,031 | 9/1987 | Suciu et al. | 549/258 |
| 5,145,650 | 9/1992 | Huttlin | 422/143 |
| 5,273,720 | 12/1993 | Zinke | 422/144 |

OTHER PUBLICATIONS

"Successfully Scale Up Catalytic Gas–Fluidized Beds", B. Jazayeri, Chemical Engneering Progres, Apr. 1995 pp. 26–31.
Fluidization and Fluid–Particle Systems, pp. 136–174, F.A. Zenz, et al., "The Gravity Flow of Bulk Solids".
Hydrocarbon Processing, pp. 81–87, Jan. 1995, G. Papa, et al., "Correlating Throughput and Backmixing in Fluidized Beds".
Chemical Engineering Progress, pp. 93–98, Oct. 1992, J.L. York, et al., "Solve All Column Flows with One Equation".

*Primary Examiner*—Nina Bhat
*Attorney, Agent, or Firm*—Oblon, Spivak, McClelland, Maier & Neustadt, P.C.

[57] ABSTRACT

A fluidized bed reactor operating under countercurrent gas-solid flow conditions wherein the reactor is supplied with horizontal baffles having separate passages through which the gas and the solid flow, such that the ascending gas leaves the baffle in a point higher than the point in which the descending solid leaves the same baffle, and the use of the reactor to perform reactions under countercurrent flow conditions while maintaining gas and solids flows of at least 70% of flooding conditions.

17 Claims, 5 Drawing Sheets

FLUIDIZED BED REACTOR AND PROCESS FOR PERFORMING REACTIONS THEREIN

BACKGROUND OF THE INVENTION

1. Field of the Invention

The present invention relates to a reactor for performing reactions in a fluidized bed operating under countercurrent gas-solid flow conditions and processes for performing reactions using the reactor.

2. Discussion of the Background

A fluidized bed is formed by passing a fluid, usually a gas, upwards through a bed of solid particles. Fluidization is achieved if the gas superficial velocity is higher than a so-called "Minimum buoyancy velocity," that is mainly a function of the density and dimensions of the particles involved.

Gas velocities higher than minimum buoyancy first induce bubbling, then cause catalyst entrainment out of the bed.

Many papers and books deal with the theoretical basis of fluidization ("Fluidization and Fluid-Particle Systems", F. A. Zenz, D. F. Othmer—Reinhold Publishing Corporation, 1960; "Gas Fluidization Technology", Edited by D. Geldart—John Wiley & Sons, 1986; "Fluidization Engineering", 2nd Edition, K. Kunii, O. Levenspiel—Butterworth-Heinemann, 1991).

The earliest applications of fluidization were for the purpose of carrying out chemical reactions. For example, the first industrial application was the gasification of coal (1926), a non-catalytic gas-solid reaction.

The widespread use of fluidized beds as chemical reactors began in the early forties with the construction of the first fluidized bed catalytic cracker (FCC). In that case, the fluidized bed technology was used to perform a catalytic reaction, i.e., the solid particles served as catalyst, undergoing no chemical changes and limited physical changes during the course of the reaction.

The catalytic materials for fluidized bed reactors are manufactured to combine favorable chemical characteristics with suitable physical properties (particle size, shape, density, resistance to attrition, etc.).

Some features of fluidized beds make them more attractive than fixed beds and other types of gas-solid reactors for performing many chemical reactions.

The main advantages of fluidized beds are:

Temperature uniformity, so that "hot spots" are easily avoided. For endothermic reactions, heat can be transferred to the reactants by the hot regenerated catalyst, avoiding heat transfer through walls; for exothermic reactions, a heat exchanger system can be provided inside the reactor vessel, which efficiently removes reaction heat owing to the fluid bed properties.

Ease of solids handling: fluidized solids can be continuously added and/or removed from the system. In catalytic reactors, deactivated solids may be transferred to a second fluidized bed system, regenerated and then recycled to the reactor.

Scale of operations: successful operations have been achieved with columns as large as 30 m internal diameter;

Turndown capacity: the gas flow rate can be varied over a wide range;

Pressure drop: the pressure drop through a fluidized bed of solids is much less than for the same bed at the same gas velocity under fixed bed conditions, especially for fine particles.

On the other hand, fluidized beds have certain limitations and disadvantages that have been clearly recognized, including:

Substantial backmixing of solids and gas, often resulting in lower conversions and selectivities than with most competing types of reactor;

By-passing of gas via bubbles or jets which causes gas-solid contact to be less effective, leads to a further lowering of conversions and may also contribute to poor selectivity;

Entrainment of solids which can lead to loss of expensive materials as well as to pollution of the atmosphere.

These limitations can be lessened by improving the design of the reactor. One effective modification is the insertion in the reactor vessel, at various heights, of internal structure in the form of horizontal or vertical baffles.

These baffles can assume many physical forms (bundles of tubes, wire cloth, perforated plates, triangular tiles, etc.).

The main role of the baffles is to drastically reduce the phenomena of backmixing, hindering the free movement of solids along the bed. The main fluidized bed is thus divided into a number of smaller beds, each one behaving like a stand-alone bed, exchanging gas and solids with the neighboring beds.

Baffles help to reduce by-passing, induce breakage of the largest gas bubbles, and reduce entrainment as well because the solids, colliding with the baffles lose part of their kinetic energy. Industrial applications of fluidized beds with baffles have been described (See publications above cited).

SUMMARY OF THE INVENTION

Accordingly, one object of the present invention is to provide a fluidized bed reactor which operates under countercurrent flow conditions wherein the reactor is supplied with horizontal baffles having separate passageways for the gas and the solid such that the ascending gas leaves the baffle in a point higher than the point in which the descending solid leaves the same baffle.

A further object of the present invention is to provide a process for performing reactions in a fluidized bed reactor which provides improved yields by control of the conditions used to maintain solid and gas flow at near flooding conditions.

A further object of the present-invention is to provide an improved process for performing reactions in a fluidized bed reactor by control of conditions with respect to flooding and by use of a reactor having horizontal baffles which have gas and solid passing through the same passageways such that the gas leaves the baffle at a level equal to the level at which the solids exit the baffle.

A further object of the present invention is to provide an improved process for performing reactions in a fluidized bed reaction by control of conditions with respect to flooding and by use of a reactor having horizontal baffles which have separate passageways for gas and solid such that the gas leaves the baffle at a point higher than the point at which the solids exit the baffle.

These and other objects of the present invention have been satisfied by the discovery that improved process yields can be obtained by operating the fluidized bed reactor under countercurrent flow conditions such that the gas and solid flow are at least 70% of flooding conditions. Further improvements are obtained by use of a fluidized bed reactor which operates under countercurrent gas-solid flow conditions, wherein the reactor contains horizontal baffles which allow the passage of gas upward and solid downward.

In a preferred embodiment, the horizontal baffles are constructed such that the ascending gas leaves the baffle at a point higher than the point at which the descending solid leaves the same baffle. In a further preferred embodiment the baffles are designed such that the ascending gas passes upward into the mouth of a tube which curves above the baffle to direct the gas back down in a direction towards the top of the baffle, while the solid exits the baffle downward from a point lower than the mouth of the curved tube. As an additional embodiment, the baffles are designed such that an inverted chevron baffle is placed over the passageway through which the gas passes in order to redirect the gas downward onto the top of the baffle.

BRIEF DESCRIPTION OF THE FIGURES

A more complete appreciation of the invention and many of the attendant advantages thereof will be readily obtained as the same becomes better understood by reference to the following detailed description when considered in connection with the accompanying figures, wherein.

DETAILED DESCRIPTION OF THE PREFERRED EMBODIMENTS

Figure 1:
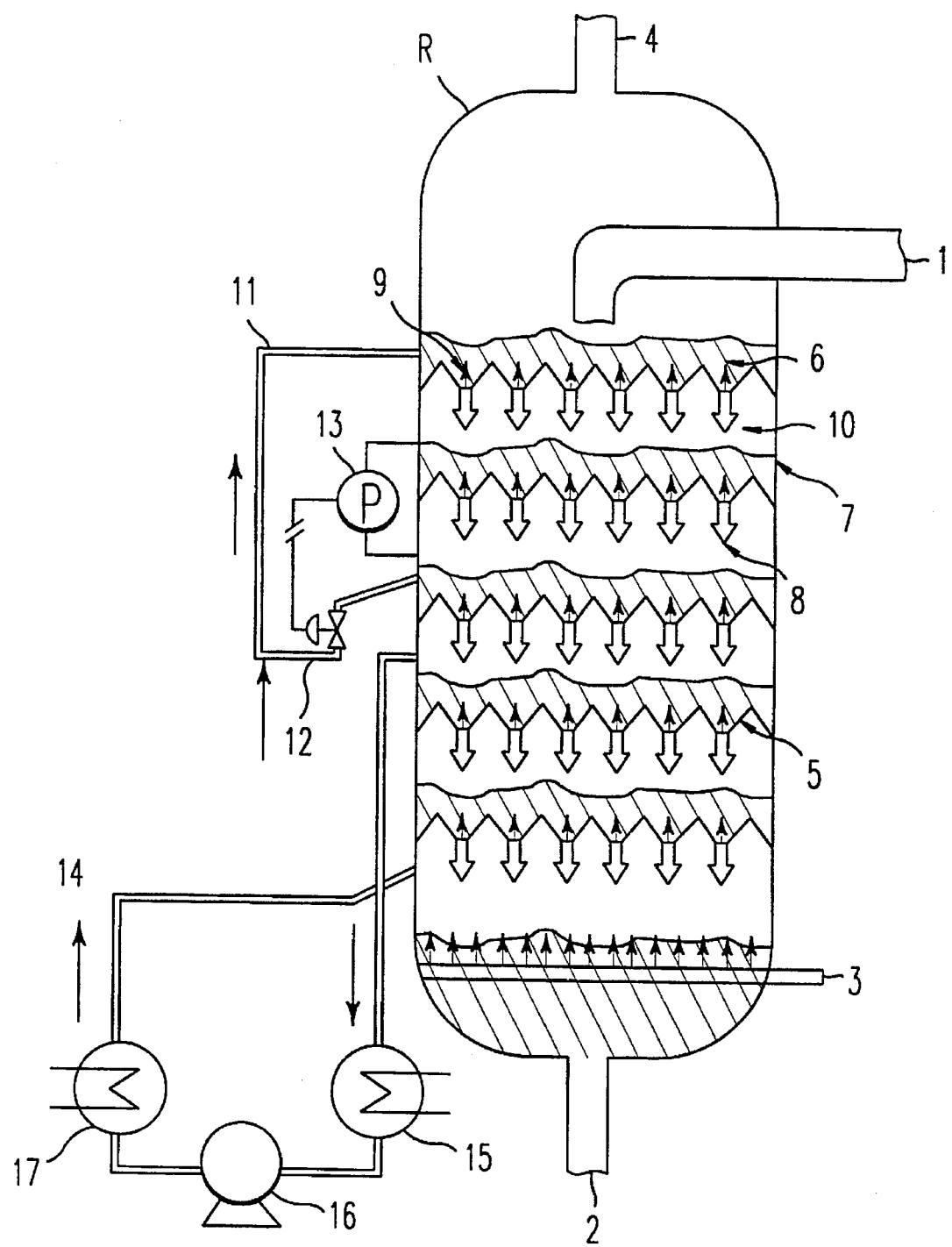
FIG. 1 is a representation of a fluidized bed reactor of the present invention having free area only in the downward portion of the baffle, through which both gas and solid can flow.

The present invention relates to a process for performing reactions in fluidized bed reactors under countercurrent gas-solid flow conditions, wherein the reaction is carried out in such a way that the gas and solid flow are at least 70%, preferably from 70 to 95%, of flooding conditions. This can be done using conventional baffled reactors having the gas and solids passing through essentially the same holes, or can be performed, in a preferred embodiment, using a reactor supplied with horizontal baffles having separated passageways for the gas and the solid, such that the ascending gas leaves the baffle in a point higher than the point in which the descending solid leaves the same baffle.

By analogy with gas-liquid systems, typical of distillation columns, a condition of "flooding" can be defined for gas-solid countercurrent fluid bed systems. "Flooding" is a condition at which the superficial gas mass velocity is increased to a point where the solid phase cannot flow down anymore and fills the whole column (Treybal, Mass transfer operations, McGraw-Hill, 1980, p. 194).

At the same time, a zone of "loading" is defined, usually at flowrates of about 70–80% of the flooding flowrates. The zone of "loading" is the optimal zone for distillation operations where the most effective contact between the phases is achieved.

The concepts of loading and flooding have been recently generalized to the countercurrent vertical flow of two phases in a vessel with internal annular baffles or stripper sheds, having only a single passage in a baffle level (Zenz et al., 1992). The same paper reports a correlation that allows the determination of the flooding flowrates as a function of the free area of the baffles, their spacing and the densities of the two phases, which is also applied to packed absorption columns containing no baffles.

The correlation can be graphically represented as shown in Chemical Engineering Progress—October 1992—page. 93 and following: "Solve All Column Flows With One Equation", J. L. York, J. T. Barberio, M. Samyn, F. A. Zenz, J. A. Zenz.

However, no determination has been made regarding gas-solid countercurrent flow systems prior to the present invention.

The present process can be utilized most effectively when the solid in the fluidized bed reactor can act as a catalyst. For example, when the gas phase contains a paraffin and the solid is a dehydrogenation catalyst or when the gas phase contains linear olefins and the solid is a skeletal isomerization catalyst.

The open spacing between the elements of the baffles is maintained such that a dilute phase is formed immediately below the baffle. Thus, the countercurrent solids and gas flows are close to the flooding point, in which the solids cannot flow down through the baffle at the desired circulation rate.

The normal contact for the gas flowing up through a fluid bed is in the bubble phase with the bubble flow velocity considerably higher than the superficial gas velocity up through the vessel. This can be several times the superficial velocity. It is conventionally known that the main gaseous reaction takes place primarily in the "bubble cloud" volume immediately surrounding the bubble of gas. Thus the gas contact time with the solids is very low.

In the present invention the bubbles are mostly eliminated, and solids rain down through the ascending gas at the near flooding conditions. This greatly increases the effective contact time with the result being a much lower reactor holdup requirement.

The "free area" (or open spaces) of the baffle can be adjusted from baffle to baffle to compensate for the generation or reduction of gas phase due to reaction.

In the reactor used in the process of the present invention, each level of baffles can be aligned such that the baffles run in parallel with one another from level to level. Alternatively, each successive level of baffles can be rotated with respect to the baffles immediately below, if desired. This rotation of baffles can be up to a 90° rotation.

The present process preferably uses solids having particles in the 20 to 300 micron particle size range with the average size being 50 to 100μ. However, it is also applicable to much larger particles. Larger particles form very large bubbles which rise very quickly in a fluidized bed, thus, bypassing much of the catalyst in the bed. The present invention allows operation while avoiding the bubble phase in the majority of the bed and produces much more efficient contacting for these large particles.

In a preferred reaction of the present invention the baffles are so designed that the solids exit downward at a lower elevation and the gas exits upward at a higher elevation in the same baffle. Thus, the baffle is a series of opposing sloped surfaces as represented in FIG. 2.

Figure 2:
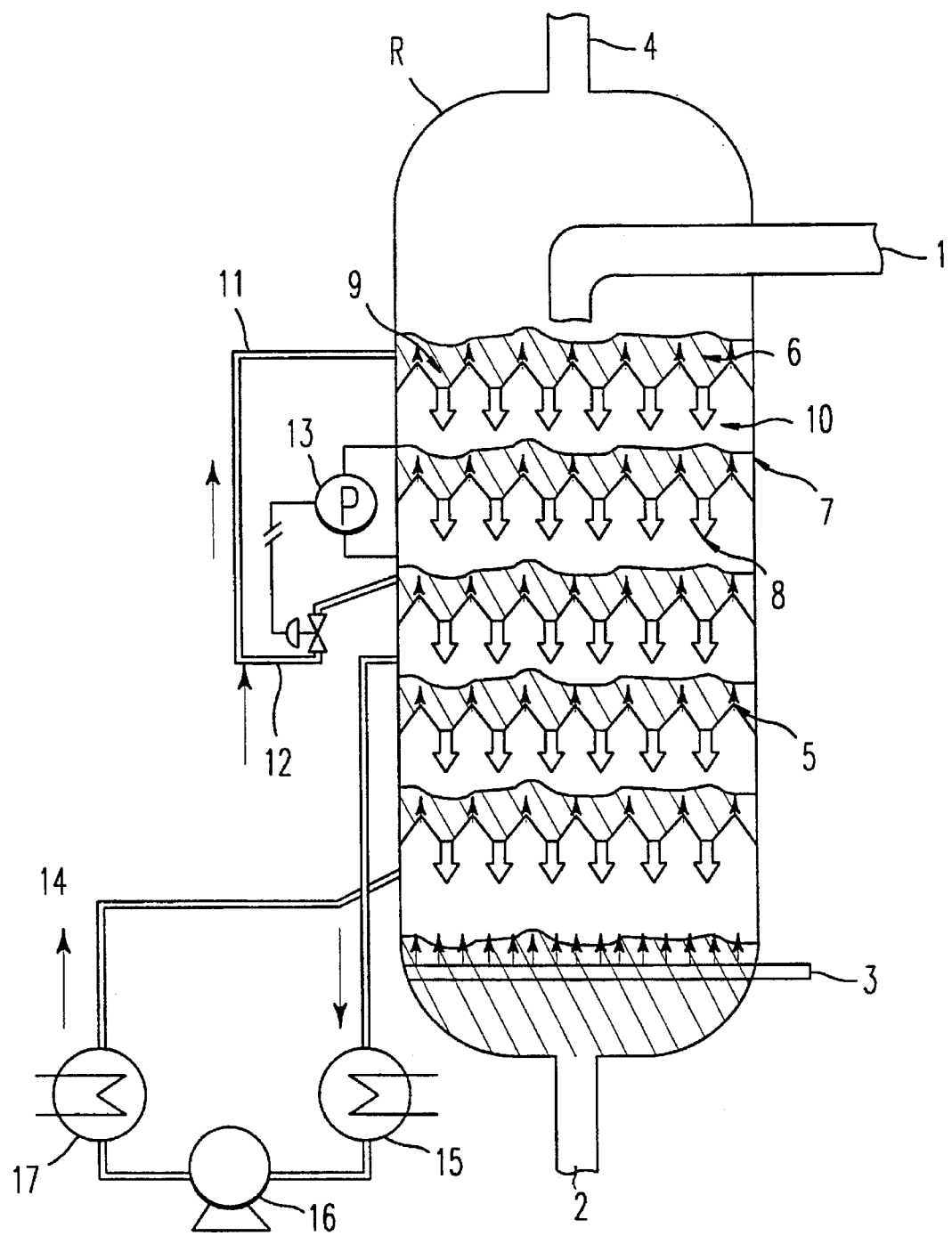
FIG. 2 is a representation of a fluidized bed reactor of the present invention having gas passages (9) and solid passages (8) at levels such that the ascending gas passes through the baffle at a point higher than the point at which the descending solid passes through the baffle.

It has been found that if a countercurrent fluid bed reactor with horizontal baffles, as shown in FIG. 2, is used having different passageways for the gas and the solid it is possible to increase the yield of the product obtained in the reaction in question. In addition, by combining these preferred baffles with the requirement of the present process that the gas and solids flows be at least 70% of the flooding conditions, one obtains even further improvements in the yield of product of a given reaction.

The difference in elevation between the solids flow downward and the gas flow upward is small, preferably from approximately 1 to 3 inches.

The baffles are placed in the reactor at a spacing between levels which is readily determined by conventional techniques. In placing the baffles in the reactor, the more baffles present, the lower the flooding velocity. However, with large spacing, there is a greater chance to form large bubbles. Also with minimum spacing the dilute phase under a baffle can limit the amount of catalyst in the bed. Preferably the baffle levels are spaced from 6 in. to 3 ft. apart.

The width of the baffles themselves is quite narrow in order to maximize the number of paths of flow of raining solids down through the dilute phase beneath the baffle. The horizontal spacing between the baffles can be quite small, on the order of ¼ inch, so as to present the maximum solids surface.

This preferred spacing between baffles on a given level, i.e. the size of the gaps or openings through which the gas and solids pass, is defined by the following equation:

$$\left[\frac{ACFM/ft^2}{[\rho_D/\rho_G]^{1/2}}\right]^{2/3} = 60^{2/3}\left(\frac{g}{2\tan 70°}\right)^{1/3} D_W^{1/3} - \left[\frac{60}{\sqrt{2}}\right]^{2/3}\left[\frac{lbs/sec \times ft^2}{\rho_D}\right]^{2/3}$$

wherein $ACFM/ft^2$ is actual cubic feet of gas per minute per square foot of area;

$\rho_D/\rho_G$ is the ratio of density of solids to density of gas;

g is the standard gravitational constant;

$D_W$ is the spacing between baffles in feet, or diameter of holes in feet if using a perforated plate; and $lb/sec \times ft^2$ is the pounds of solid flow per second per square feet of area.

With this preferred system, even distribution of solids and gas flow across the cross-sectional area of the vessel is insured, while this even flow is not insured if the solids and gas leave the baffle at the same elevation at higher processing velocities. However, improvements are obtained in the present process just by maintaining the gas and solids flows at the correct percentage of flooding, even if the gas and solids are being forced to flow through the same openings in the baffles. When the preferred baffles of the present invention are used, this increase in yield becomes even greater.

The present process could have general application to many fluid solids processes which have high catalyst holdup requirements in the fluid bed. Suitable processes include dehydrogenation, FCCU stripping, FCCU regeneration, ammonia synthesis, oxidation of $SO_2$ to $SO_3$, Fischer-Tropsch reactions, melamine and maleic anhydride reactors.

The reactor of a preferred embodiment of the present invention is similar to a dilute phase or transfer line reactor with one significant difference being that the dilute phase contact can be done at gas velocities of 1 to 3 ft/sec, rather than 20 to 40 ft/sec. Thus, the vertical length of the reactor system is reduced tenfold. Also higher solids/gas rates can be realized.

The baffle spacing is important in defining the dilute phase zone and limiting velocities.

It is recognized that baffles with free areas of 20–25% have been applied in commercial units previously. However, these installations have operated at 40 to 50% of the flooding velocities. At these rates the dilute phase contact zone does not predominate and the reactions are not enhanced.

The flows must be just below the flooding point in order to insure solids flow through the vessel. This can be insured in several ways in combination with the adjustment of the baffle width and spacing.

A first method is a provision of one or more external gas recycle lines which are each separately controlled with respect to flow rate to insure the proper approach to the flooding point.

A second method is the provision of one or more external solids circulation lines which are each separately controlled, with respect to flow rate, to insure the proper approach to flooding.

The latter technique will preserve any temperature gradient from the top of the bed to the bottom if the external solids rates are low and several lines are provided covering different sections of the vessel.

The advantage of solids circulation is that it can be implemented without cooling the solids. A gaseous recycle must be cooled to be compressed and then reheated before reinfecting into the bed.

The approach to flooding can be determined by a density measurement of the phase between the baffles with the gas and solids rates being controlled by keeping the proper pressure buildup between the baffles.

It has been previously determined that the optimum condition required for uniform lateral gas distribution at a given level is that the gas distribution must experience a pressure drop equal to 30% of the pressure drop though the bed above it. This criterion insures that the gas flow starts up through the next baffle equally distributed. The baffle design prevents formation of larger bubbles which disrupt contacting. Baffle spacing must be sufficient to provide a proper continuous dilute phase under the baffle at the flow rates desired. The dense phase between the baffles can be 40–50% of the baffle spacing, preferably 50%. To satisfy this fundamental criterion the beds above the baffles are preferably shallow, most preferably less in depth than the horizontal gap width between the baffles in order to provide full distribution over the entire bed section.

Figure 3A:
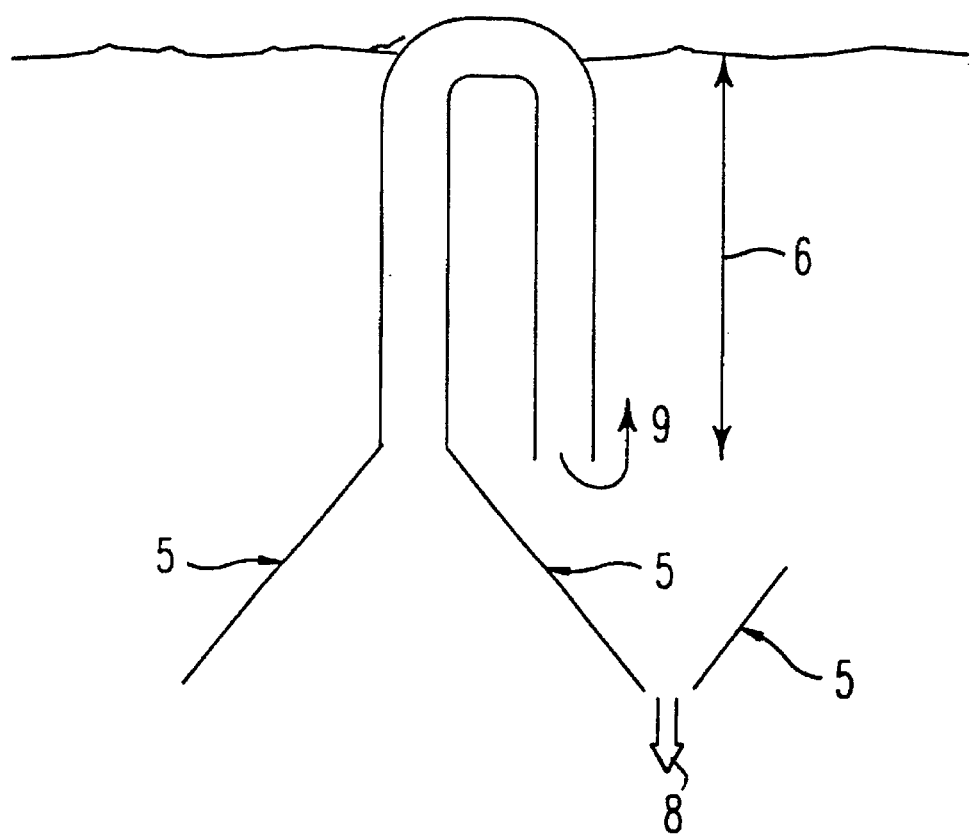
FIG. 3 is a representation of two modifications of the baffles of FIG. 2 in which the gas passages are modified to have (a) curved tubes which redirect the ascending gas downward towards the top of the baffle through which the gas first passed or (b) inverted chevrons over the gas passageway to redirect the ascending gas downwared towards the top of the baffle through which the gas first passed.
Figure 3B:
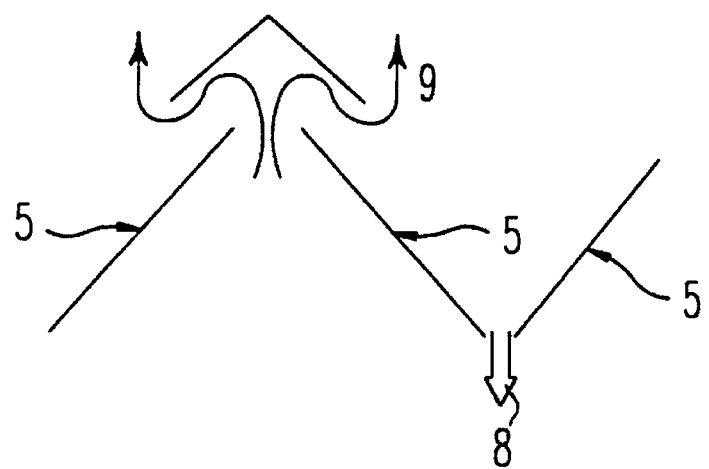

In a preferred embodiment of the present invention, the baffles of the present system are modified such that the ascending gas passes into a pipe wherein the end of the pipe which is attached to the baffle is at a point higher than the point at which the solids pass downward through the baffle. The gas then traverses the pipe, which is curved to return the gas in a downward direction exiting from the pipe above the baffle to which the pipe is attached. This modified baffle is shown schematically in FIG. 3(a). By directing the gas downward, it is possible to considerably increase the bed depth, since the criterion of the "30% pressure drop" can be relaxed. In fact, it has been found that the bed depth can be approximately tripled, or the active reactor vessel cross-sectional area increased by a factor equal to the square root of 3, using such a modified baffle. A similar improvement can be realized using the baffle shown in FIG. 3(b) which uses an inverted chevron baffle placed above the passageway through which the gas flows, in order to redirect the gas into a downward path towards the top of the baffle through which the gas passed.

The process according to the present invention can be schematized as shown in FIGS. 1 and 2. In the reactor (R) the solid enters in (1) and exits from (2), coming in countercurrent contact with the gas which enters in (3) and exits from (4). The reactor is supplied with horizontal baffles (5) supporting the catalyst beds (6), with (7) the solids level above baffle and (10) the dilute phase represented.

The gas and solid flow can be maintained close to the flooding conditions alternatively by means of:

a recirculation (11) of the solid accumulated in a baffle to another baffle placed superiorly by using a lift gas (12), where with (13) the pressure differential controls solids flow is represented;

a recirculation (14) of the gas drawn above a baffle, after cooling in (15), compressing in (16) and heating in (17).

Figure 4A:
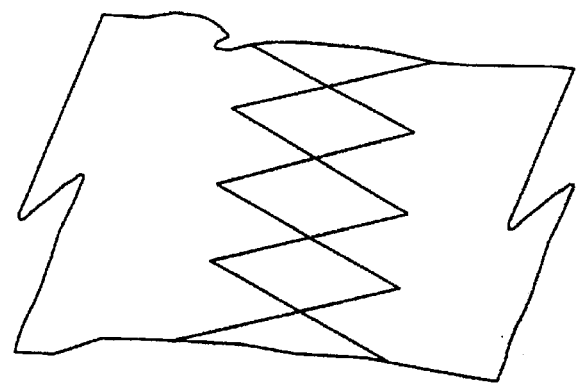
FIG. 4 is a representation of (a) plan, (b) elevation and (c) isometric views of a further modified baffle in which the gas and solids pass through the same passageway, but due to the design, the gas inherently passes through the baffle at a level above the level at which the solids pass downward through the baffle.
Figure 4B:
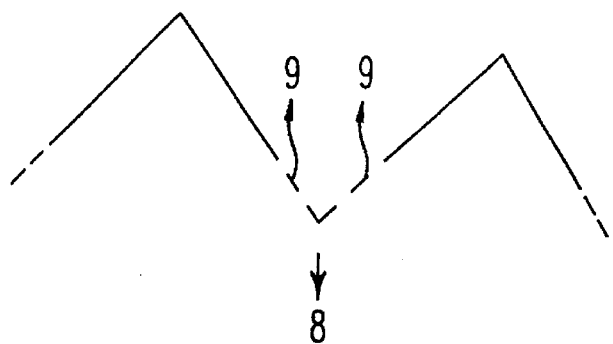
Figure 4C:
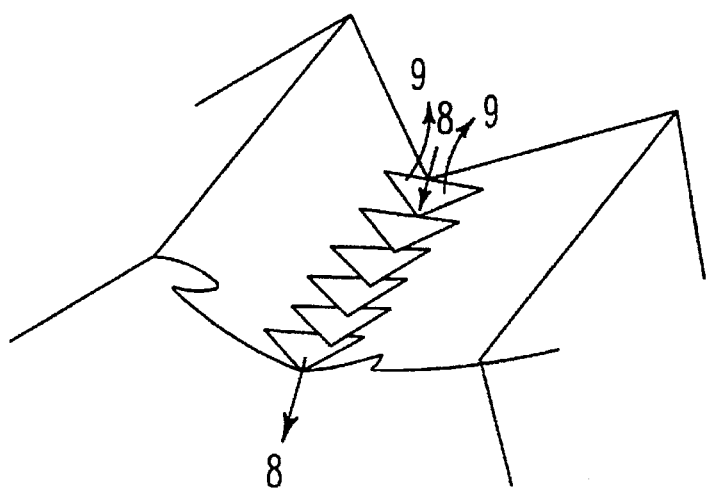

In FIG. 1, an embodiment is shown in which (8) the solids flow through the baffle and (9) the gas flow through the baffle are through the same set of openings. It should be recognized that the solids and gas do not necessarily have to be simultaneously flowing through the same opening. In fact, openings will generally preferentially allow gas flow while others will preferentially allow solids flow. The key in this embodiment is that the openings through which the gas and solids flow are all approximately on the same horizontal plane (as compared to the embodiment shown in FIG. 2, described below). In an improved embodiment of the baffles of FIG. 1, the baffles can be formed such that the openings are in the shape of diamonds as shown in FIG. 4(a)–(c). FIG. 4 shows a (a) plan, (b) elevation, and (c) isometric view of a modified baffle which allows gas and solids to pass through the same opening consistently, while also having the gas ascend through a portion of the opening which is higher than the portion of the opening through which the descending solids pass. This arrangement provides the maximum amount of contact between the gas and solid phases.

In FIG. 2, a preferred embodiment is shown in which (8) the solids flow through the baffle, and (9) the gas flow through the baffle are shown to be at different levels with the gas flow through the baffle (9) occurring at a point of the baffle which is higher than the point at which the solids flow through the baffle (8) is occurring.

Having generally described this invention, a further understanding can be obtained by reference to certain specific examples which are provided herein for purposes of illustration only and are not intended to be limiting unless otherwise specified.

EXAMPLES

Example 1

This example has been provided in order to clarify one method which can be used to experimentally determine the flooding point.

An acrylic pilot unit operating at room temperature was provided with metallic baffles whose shape was a horizontal array of angled slats.

A fluid powder, in this example a $K_2O/Cr_2O_3/Al_2O_3$ dehydrogenation catalyst, was allowed to circulate from the top to the bottom of the plant, while the gas used was air.

According to the definition given before, at the flooding point some solids buildup forms at the uppermost baffle, while the lower baffles get short of solids.

In this example, visual observations were combined with catalyst level evaluations by means of U-shaped water manometers which measured the pressure drop between the uppermost baffle and the top of the reactor (i.e., catalyst buildup above the baffle), and the change in pressure (delta pressure) from just below the middle of the bed up to the uppermost baffle (bed density). It is known from the literature that fluid bed density can be evaluated from the pressure drop.

Gas flow was evaluated by means of a Pitot tube. Actual flow was estimated by measuring the actual temperature and pressure; pressure and flow evaluations were accomplished as close as possible to the baffle.

There are three ways to approach flooding point (at a fixed pilot plant configuration):

increasing gas flow rate;

increasing solid circulation; and increasing both gas flow rate and solid circulations.

The present example was operated by increasing the gas flow rate, as it was the simpler one to realize.

Figure 5:
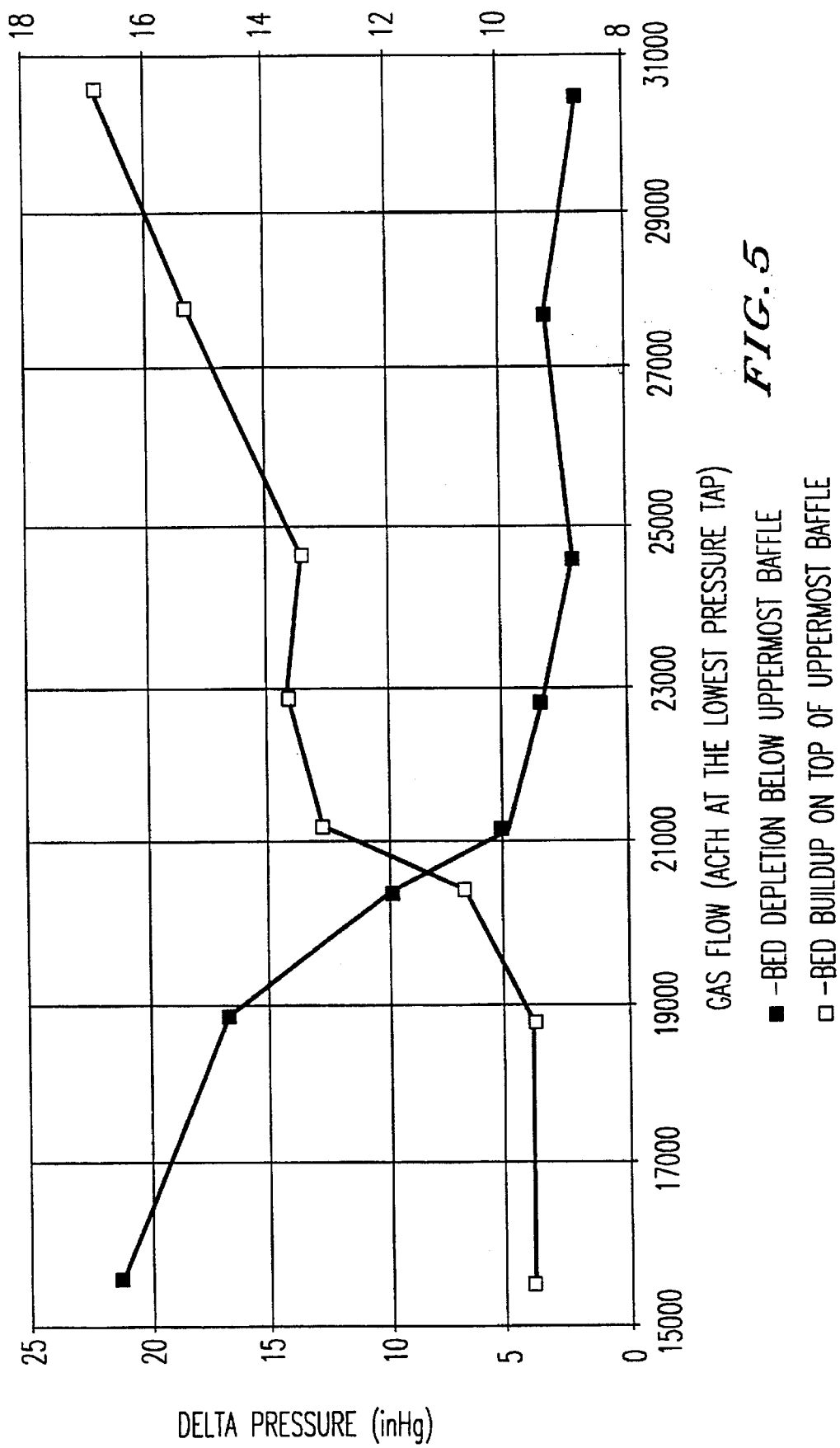
FIG. 5 is a graph of the change in pressures obtained in Example 1 below, used to determine flooding point.

FIG. 5 shows the trend of pressures observed. It was experimentally found that the sudden pressure change of FIG. 5 agrees well with the visual observation of the flooding point. FIG. 5 shows the trend in pressures related to the bed depletion below the uppermost baffle and the bed buildup on top of the uppermost baffle.

A pilot plant operating under real dehydrogenation conditions was thus equipped in a similar way, in order to allow an instrumental determination of the flooding point.

The operative percentage of gas and solid circulations, relative to the flooding point, was evaluated according the following procedure:

(1) experimentally determined flooding points were plotted in a graph, (according to Chemical Engineering Progress, October 1992, page. 96);

(2) a given operative condition was reported in the same way in the same graph;

(3) a 45° sloped line (representative of the same gas/solid flow ratio points) was drawn from the point showing the given operative condition up to the flooding curve;

(4) the intercept of such a line with the flooding curve gave the solid and gas flooding flows; and (5) percentage was evaluated relative to such flooding circulations.

Example 2 (comparative)

The reaction of catalytic dehydrogenation of isobutane to isobutene was carried out on a pilot-plant operating under fluidized bed conditions and containing a reactor and a regenerator connected by suitable lines of transport to allow the continuous transfer of solid between the two vessels.

The catalyst was $Cr_2O_3/Al_2O_3$ with average particles diameter equal to 70μ.

A flow rate of 150 $Nm^3/h$ of pure isobutane was fed to the reactor in countercurrent with the solid and the inventory of catalyst in the reactor was sufficient to maintain a space-velocity of 150 Nl/h/l of deaerated catalyst.

In the bed, ten baffles were inserted in the form of drilled plates with a free area of 25%, in such a way that the gas flow rate was the 30% of the flooding flow rate at equal circulating fluid flow rate.

On the top of the catalytic bed, at the point of outlet of gas, a temperature of 580° C. and a pressure of 1.3 Atm was maintained.

A molar yield to isobutene of 42.2%, was obtained corresponding to 74% of the yield attainable at equilibrium.

Example 3

This example was performed as in Example 2, with the exception that the baffles were substituted with baffles according to a preferred embodiment of the present invention as shown in FIG. 2, having the same 30% of free area as those used in Comparative Example 2.

In this case a molar yield to isobutene of 47.5%, was obtained corresponding to about 83% of the yield to the equilibrium. Thus by just changing the baffles to a configuration wherein the gas and solids flows leave the baffle at different levels, a significant increase in molar yield can be achieved.

Example 4

This example was performed in accordance with Example 2, with the exception that the baffles of Example 2 were adjusted to provide a reduced free area to provide a flow rate which was 90% of the flooding flow rate, at the same amount of circulating solid.

In this case a molar yield to isobutene of 49.3% was obtained, corresponding to about 87% of the yield to the equilibrium. Thus by adjusting baffles to provide a flow rate which was approaching the flooding rate, a significant increase in molar yield was also obtained.

Example 5

This example was performed in accordance with Example 2, with the exception that the baffles were replaced by baffles in accordance with a preferred embodiment of the present invention shown in FIG. 2, which has the gas and solids flows leaving the baffles at different levels of the baffle. Further the baffles were adjusted to provide a free area which was equivalent to that of Example 4 to maintaining a flow rate of 90% of flooding.

By maintaining all other operative conditions equal to Example 4, a molar yield to isobutene of 54.2% was obtained, corresponding to about 95% of the yield of equilibrium. This shows the surprising improvements in molar yield obtained when the preferred baffles of the present invention, as shown in FIG. 2, are combined with the preferred flow rate at near flooding conditions.

Obviously, additional modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A fluidized bed reactor which operates under countercurrent gas-solid flow conditions, comprising a vessel having arranged therein one or more levels of horizontal baffles, wherein each level of horizontal baffles has separate passages through which ascending gas and descending solid flow, such that the ascending gas leaves the baffles level at a first point higher than a second point in which the descending solid leaves the same baffles level.

2. The fluidized bed reactor of claim 1, wherein said one or more levels of horizontal baffles are spaced so as to provide a flow rate of gas and solid which is at least 70% of the flooding flow conditions.

3. The fluidized bed reactor of claim 1, wherein said one or more levels of horizontal baffles are configured such that the ascending gas passes into one end of a pipe, wherein said one end of said pipe is connected to the baffles at said first point and extends above the baffles level, curves and redirects the gas downward toward the baffles such that the gas exits the pipe in a downward direction above the baffle to which the pipe is attached.

4. The fluidized bed reactor of claim 1, wherein said one or more levels of horizontal baffles are positioned such that the individual baffles of one level run in a direction parallel with the individual baffles of an adjacent level.

5. The fluidized bed reactor of claim 1, wherein said one or more levels of horizontal baffles are positioned such that the individual baffles of one level run in a direction which is rotated by up to 90° with respect to the direction in which the baffles of an adjacent level run.

6. The fluidized bed reactor as claimed in claim 1, wherein said one or more levels of horizontal baffles are configured such that as the ascending gas passes through the baffles, the gas is redirected by an inverted chevron placed directly above the ascending gas, which redirects the gas to a downward path toward the top of the baffles through which the gas has just passed.

7. The fluidized bed reactor as claimed in claim 1, wherein said one or more levels of horizontal baffles are configured having openings which are diamond shaped and at the same level of the baffles surface at an upward bend in the baffle surface, such that opposite corners of each diamond shaped opening are linearly disposed along the line of upward bend, such that the ascending gas and descending solids pass through the same opening in the baffles, wherein the openings in the baffles allow for the ascending gas to pass through the baffle at a point higher than a point at which the descending solids pass through the baffle.

8. A process for performing reactions in a fluidized bed reactors as claimed in claim 1, wherein the reaction is performed under countercurrent gas-solid flow conditions, wherein the gas and solid flow at rates of at least 70% of flooding conditions.

9. The process as claimed in claim 8, wherein the gas and the solid flow at rates of from 70 to 95% of flooding conditions.

10. The process as claimed in claim 8, wherein the gas and solid flow is maintained by means of a recirculation of the solid accumulated at one or more baffles levels, excluding the uppermost one, upward to one or more baffles levels above.

11. The process as claimed in claim 8, wherein the gas and solid flow is maintained by means of a recirculation of the gas drawn above one or more baffles levels and sent downward to one or more baffles below.

12. The process as claimed in claim 8, wherein the solid in the fluidized bed reactor is a catalyst.

13. The process as claimed in claim 8, wherein the gas comprises a paraffin and the solid is a dehydrogenation catalyst.

14. The process as claimed in claim 8, wherein the gas comprises one or more linear olefins and the solid is a skeletal isomerization catalyst.

15. The process as claimed in claim 13, wherein the gas is isobutane and the dehydrogenation catalyst is $Cr_2O_3/Al_2O_3$.

16. The process as claimed in claim 8, wherein the gas is steam and the solid is an FCCU catalyst.

17. The process as claimed in claim 8, wherein the gas is air and the solid is a spent FCCU catalyst.

* * * * *